United States Patent
Pawar et al.

(10) Patent No.: US 12,163,654 B2
(45) Date of Patent: Dec. 10, 2024

(54) AUDIO AND VISUAL NOTIFICATION APPLIANCE

(71) Applicant: Eaton Intelligent Power Limited, Dublin (IE)

(72) Inventors: Pratik Narendra Pawar, Maharashtra (IN); Bhavesh Jitendra Desai, Edison, NJ (US); Scott Edward Case, Highlands, NJ (US); Pushpak Paris Yabrer, Maharashtra (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/452,248

(22) Filed: Aug. 18, 2023

(65) Prior Publication Data

US 2024/0068657 A1 Feb. 29, 2024

(30) Foreign Application Priority Data

Aug. 23, 2022 (IN) .............................. 202211047881

(51) Int. Cl.
*F21V 33/00* (2006.01)
*F21V 5/04* (2006.01)
*G02B 3/00* (2006.01)

(52) U.S. Cl.
CPC .......... *F21V 33/0076* (2013.01); *F21V 5/045* (2013.01); *G02B 3/0043* (2013.01)

(58) Field of Classification Search
CPC .. F21V 33/0076; F21V 5/045; F21V 33/0064; F21V 33/00; F21V 33/0056; G02B 3/0043; G08B 5/38
See application file for complete search history.

(56) References Cited

U.S. PATENT DOCUMENTS

| | | | |
|---|---|---|---|
| 5,684,467 A * | 11/1997 | Hur ........................ | G08B 7/06 362/147 |
| 8,113,694 B2 * | 2/2012 | Rong ...................... | G09F 13/14 362/147 |
| 8,220,948 B2 * | 7/2012 | Rong ...................... | F21V 7/09 362/147 |
| 2008/0266121 A1 * | 10/2008 | Ellul ...................... | G08B 7/066 340/584 |
| 2014/0332525 A1 * | 11/2014 | Roberts .................. | H02G 3/14 220/3.5 |

(Continued)

OTHER PUBLICATIONS

Eaton Life Safety & Mass Notification Solutions Product Catalog.
Eaton Wheelock Eluxa—"Best-in-class, next generation LED notification appliances" Brochure.

*Primary Examiner* — Bao Q Truong
(74) *Attorney, Agent, or Firm* — Merchant & Gould P.C.

(57) ABSTRACT

A system or appliance for universal mounting of an audio/visual alert system, with a surface interface, having a mounting body mountable on either of a vertical surface or a horizontal surface and one or more electrical terminals. Further having a notification module with a lens configured to throw light 180 degrees vertically and 180 degrees horizontally at greater than 15 cd and a speaker. Further having an appliance cover with a cover body, a letterplate having a first side with a text in a first orientation and a second side with the text in a second orientation, wherein the letterplate is fully separable from the rest of the system; and a grill having a flat outer face.

20 Claims, 18 Drawing Sheets

(56) References Cited

U.S. PATENT DOCUMENTS

2016/0035201 A1\* 2/2016 Savage, Jr. .............. H04R 1/02
340/384.73
2020/0124239 A1\* 4/2020 Greenwood .............. F21V 5/08

\* cited by examiner

FIG. 2A
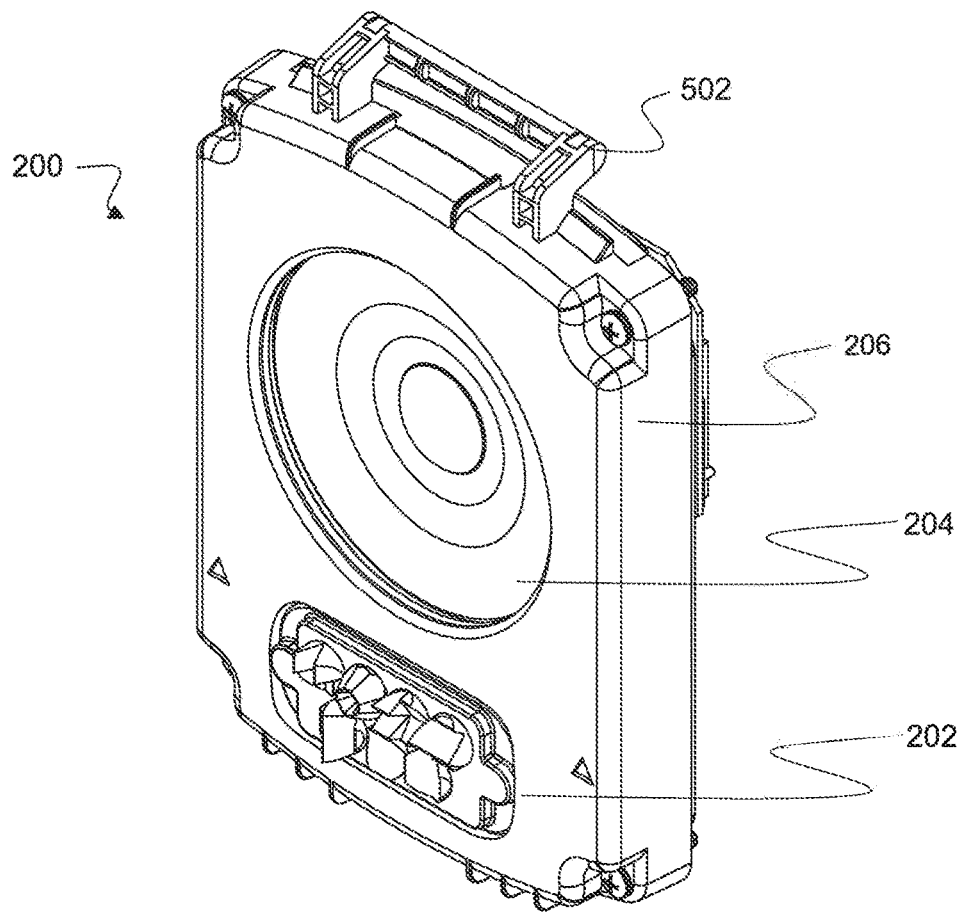
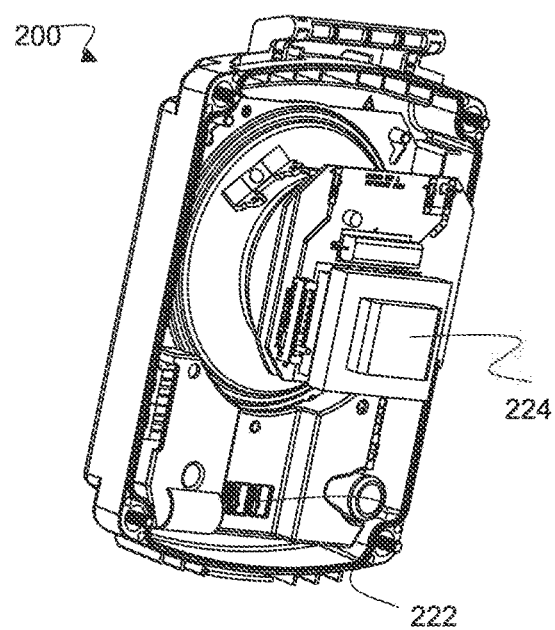
FIG. 2B

FIG. 2C
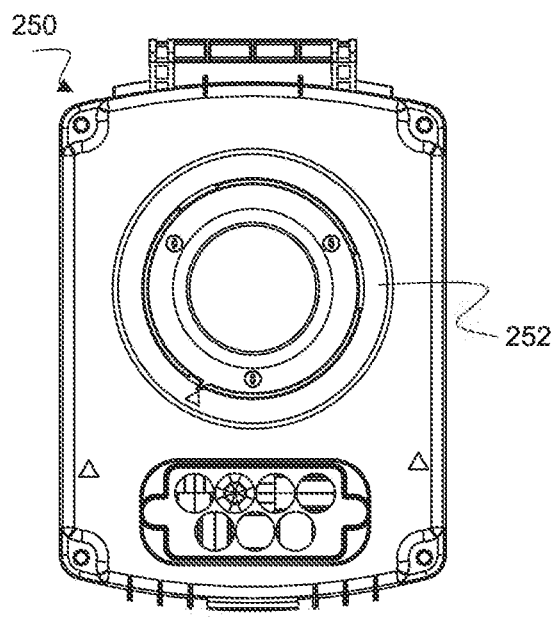
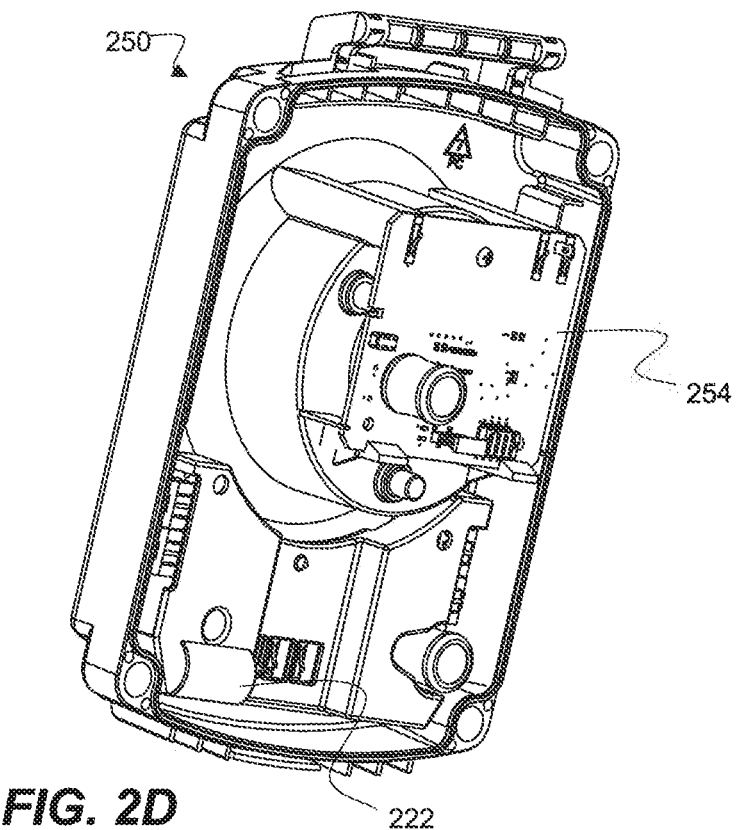
FIG. 2D

FIG. 4A
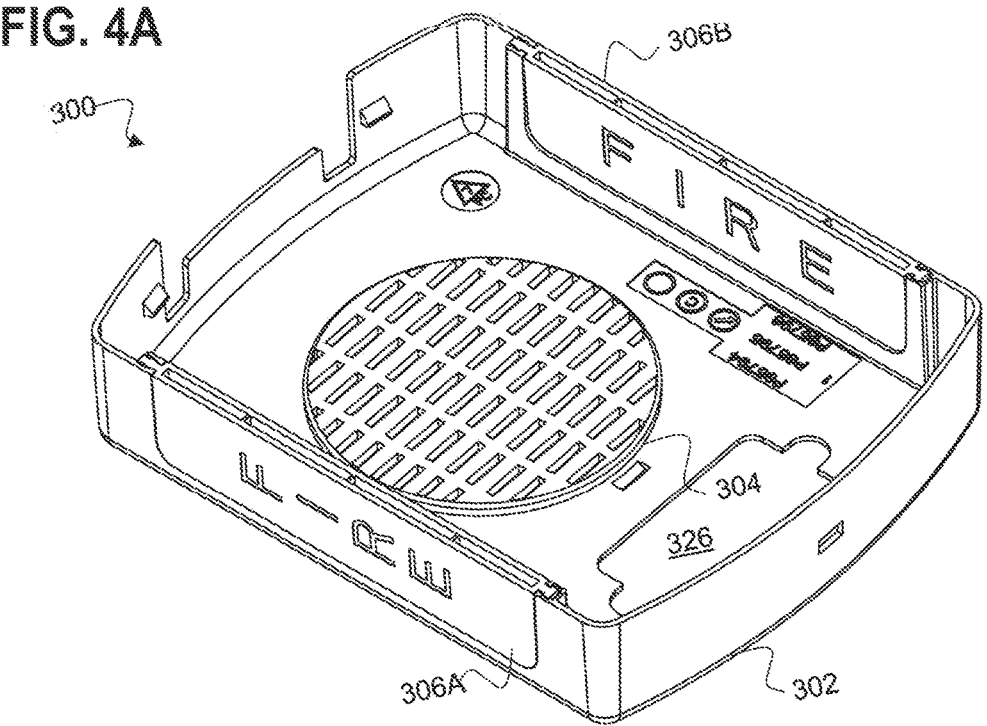
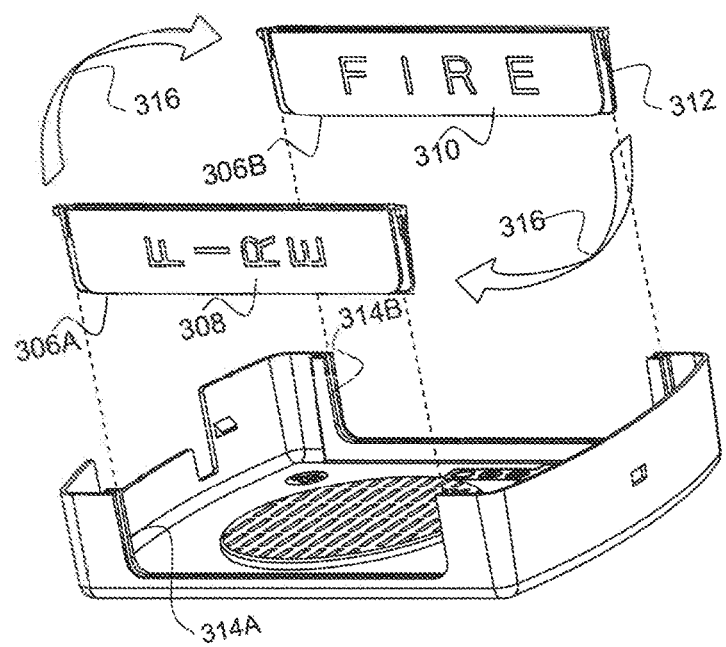
FIG. 4B

*FIG. 9C*
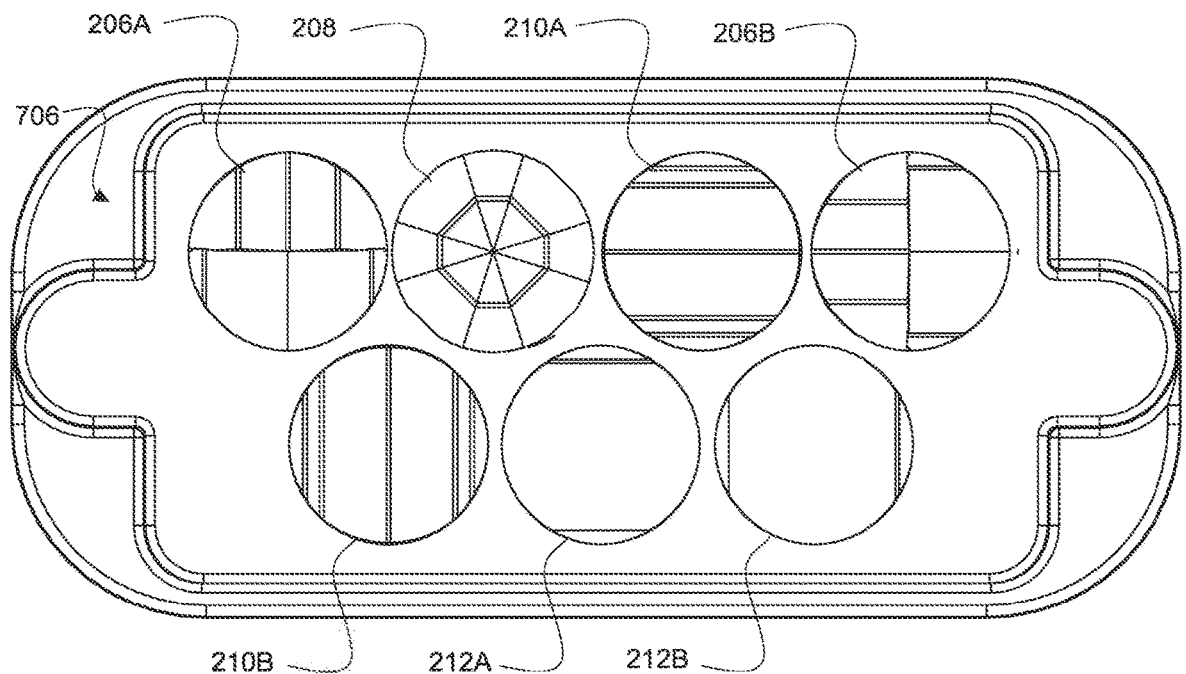
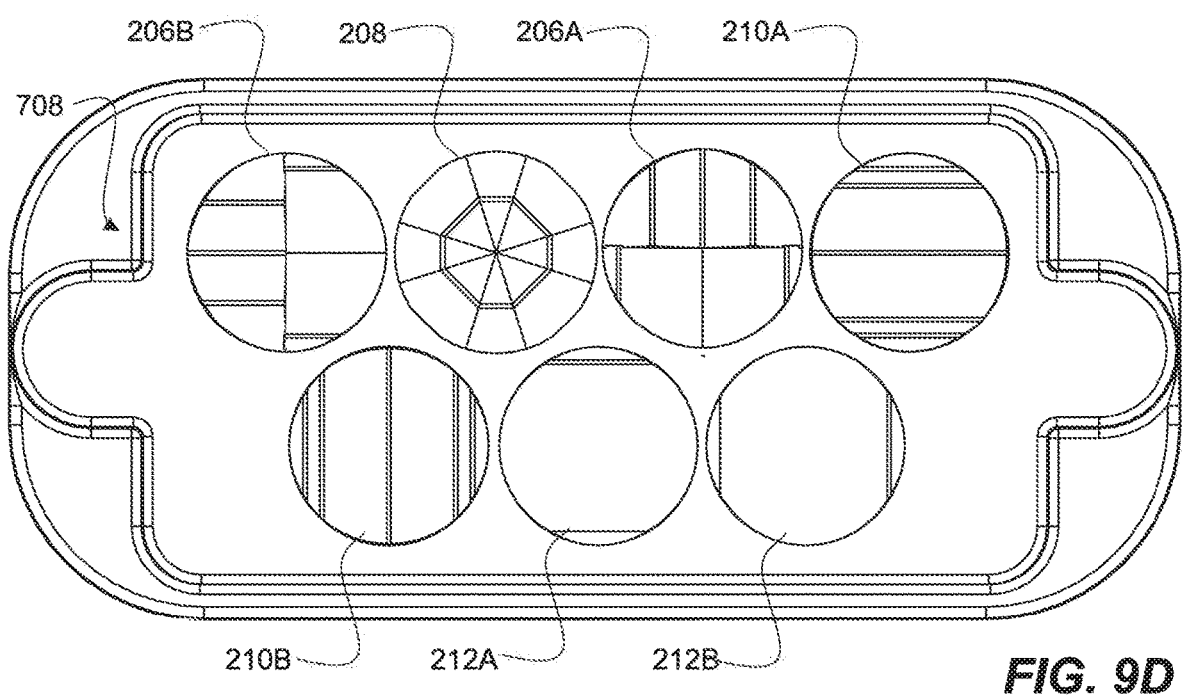
*FIG. 9D*

AUDIO AND VISUAL NOTIFICATION APPLIANCE

CROSS-REFERENCE TO RELATED APPLICATION

This application claims the benefit of Indian Provisional Patent Application No. 202211047881, filed on Aug. 23, 2022, the disclosure of which is incorporated herein by reference in its entirety.

BACKGROUND

Fire and other alarm systems are a common requirement in buildings, both public and private. For the safety of occupants, a number of alarm or other alert systems are distributed throughout the space to ensure adequate notification of all persons inside in case there is a need for an evacuation or other prompt response to an emergency situation. While high visibility of such devices is essential when an emergency or other alert situation arises, during the normal course of business and/or life, it is desirable for the notification or alert system to be unobtrusive.

The various conflicting interests guiding the number and placement of alert or other notification modules can lead to large inventories for a single building or establishment. Thus, there is a present need in the art for alert systems with capacity for more generalized use and placement.

SUMMARY

Aspects of the present disclosure describe a system or appliance for universal mounting of an audio/visual alert system, comprising a surface interface, the surface interface comprising a mounting body mountable on either of a vertical surface or a horizontal surface. and one or more electrical terminals. The system or applicant further comprises a notification module, the notification module comprising a lens configured to throw light 180 degrees vertically and 180 degrees horizontally at greater than 15 cd and a speaker. The system or appliance further comprising an appliance cover, the cover comprising a cover body, a letterplate having a first side with a text in a first orientation and a second side with the text in a second orientation, wherein the letterplate is fully separable from the rest of the system; and a grill having a flat outer face.

Further aspects of the present disclosure may include wherein the surface interface further comprises a first part of a capture hinge, the notification module further comprises a second part of the capture hinge, and the capture hinge is adapted to align the notification module with the surface interface.

Further aspects of the present disclosure may include wherein the first orientation is adapted for a vertical mounting arrangement and the second orientation is adapted for a horizontal mounting arrangement.

Further aspects of the present disclosure may include wherein the grill comprises a louvered piece forming an outlet path for sound and a tortured inlet path to prevent water entry and wherein the grill further comprises a drain. Still further aspects may include wherein the surface interface is a box mount, wherein the surface interface is a plate mount, and wherein the system is adapted for outside use.

Another aspect of the present disclosure is directed to a lens for a visual alert system adapted for mounting on either of a vertical or a horizontal surface, comprising optical features configured to throw light 180 degrees along a first orientation and 180 degrees along a second orientation, wherein the second orientation is perpendicular to the first orientation. The optical features comprising a first optical feature, a second optical feature, wherein the second optical feature is the first optical feature rotated 90 degrees, a third optical feature, a fourth optical feature, wherein the fourth optical feature is the third optical feature rotated 90 degrees, a fifth optical feature, a sixth optical feature, wherein the sixth optical feature is the fifth optical feature rotated 90 degrees, and a seventh optical feature. The lens further including one or more surfaces supporting the optical features and forming a thickness.

Other aspects of the present disclosure may include wherein the optical features are arranged in a first row of four features and a second row of three features, wherein the first row is arranged with a first position, a second position, a third position, and a fourth position, with the seventh optical feature in one of the second position or the third position, wherein the first row comprises the first optical feature, the second optical feature, the third optical feature, and the seventh optical feature, wherein the second row comprises the fourth optical feature, the fifth optical feature, and the sixth optical feature, wherein each of the first optical feature, the third optical feature, the fifth optical feature, and the seventh optical feature has a unique geometry, wherein the first optical feature distributes a majority of light from 30 degrees to 60 degrees in symmetry, wherein the third optical feature distributes a majority of light from 50 degrees to 90 degrees in symmetry, wherein the fifth optical feature distributes a majority of light from 0 degrees to 40 degrees in symmetry, wherein the seventh optical feature distributes a majority of light off-axis in symmetry, or wherein each optical feature distributes light in symmetry.

Another aspect of the present disclosure describes a lens for a visual notification appliance, the lens including a first row of optical features having a first feature distributing light primarily from 30 degrees to 60 degrees and 120 degrees to 150 degrees along a first axis; a second feature distributing light primarily radially outward from a central axis of the second feature; a third feature distributing light primarily from 50 degrees to 130 degrees along the first axis; and a fourth feature distributing light primarily from 30 degrees to 60 degrees and 120 degrees to 150 degrees along a second axis, the second axis perpendicular to the first axis. The lens may also include a second row of optical features having a fifth feature distributing light primarily from 50 degrees to 130 degrees along the second axis, a sixth feature distributing light primarily from 0 degrees to 40 degrees and 140 degrees to 180 degrees along the first axis, and a seventh feature distributing light primarily from 0 degrees to 40 degrees and 140 degrees to 180 degrees along the second axis.

Another aspect of the present disclosure describes a lens for a visual notification appliance, the lens including a first row of optical features, wherein each optical feature distributes light symmetrically in relation to itself along either a first axis or a second axis, wherein the second axis is perpendicular to the first axis, the first row having a first feature distributing light in a first arc along the first axis, a second feature distributing light primarily radially outward from a central axis of the second feature, a third feature distributing light in second arc along the first axis, wherein the second arc partially overlaps with the first arc, and a fourth feature distributing light in the first arc along the second axis. The lens may further include a second row of optical features having a fifth feature distributing light in the second arc along the second axis, a sixth feature distributing light in a third arc along the first axis, wherein the third arc partially overlaps with the first arc, and a seventh feature distributing light in the third arc along the second axis.

Another aspect of the present disclosure may describe an audio and visual notification appliance including a base adapted to be mounted to a ceiling or to a wall, the base including a first audio electrical terminal arrangement and a first LED electrical terminal arrangement. The notification appliance may further include an audio and lighting module including a module frame including a front side and a back side, the module frame supporting an audio system and a lighting system, the back side being adapted for mounting to the base, the audio system including a second audio electrical terminal arrangement adapted to electrically connect with the first audio electrical terminal arrangement when the audio and lighting module mounts to the base to provide electrical power to the audio system, the audio system including an audio speaker at the front side of the module frame, the lighting system including a second LED electrical terminal arrangement adapted to electrically connect with the first LED electrical terminal arrangement when the audio and lighting module mounts to the base to provide electrical power to the lighting system, the lighting system including an LED lens at the front side of the module frame, the LED lens being configured to distribute LED light generated by the lighting system in a light distribution pattern suitable for both ceiling mount and wall mount applications. The notification appliance may further include a front cover that mounts over the front side of the module frame, the front cover including opposite first and second side walls each defining a panel receiving opening in which a reversible panel mounts, each reversible panel including a first side including lettering arranged in a first orientation suitable for ceiling mount applications and a second side including lettering arranged in a second orientation suitable for wall mount applications, wherein to configure the audio and visual notification appliance for ceiling mount applications the panels are mounted in the panel receiving openings with the first sides of the panels facing outwardly so as to be visible and the second sides of the panels facing inwardly so as to not be visible, and wherein to configure the audio and visual notification appliance for wall mount applications the panels are mounted in the panel receiving openings with the second sides of the panels facing outwardly so as to be visible and the first sides of the panels facing inwardly so as to not be visible.

Other aspects of the present disclosure may describe: wherein the base can be selected from a first base for configuring the audio and visual notification appliance in a surface mount configuration and a second base for configuring the audio and visual notification appliance in a semi-flush mount configuration; wherein the module frame connects to the base by a hinge including a hook that pivotally engage a hinge pin; or wherein the base can be mounted to the wall or ceiling and connected to electrical wiring prior to mounting of the audio and lighting module to the base, and wherein the hinge guides movement of the audio and lighting module to an aligned position relative to the base in which the first audio electrical terminal arrangement and the first LED electrical terminal arrangement respectively connect with the second audio electrical terminal arrangement and the second LED electrical terminal arrangement; or wherein the audio and visual notification appliance includes first and second opposite sides that extend between first and second opposite ends, wherein the hinge s located at one of the ends and the first and second side walls of the front cove rare located at the first and second opposite sides.

Other aspects of the present disclosure may describe wherein letters of the lettering at the first side of each reversible panel are rotated 90 degrees with respect to letters of the lettering at the second side of each reversible panel, or wherein the front cover defines an opening for receiving the LED lens, wherein the front cover defines a grill for covering the speaker, wherein the grill includes a grill pattern including openings each having at least 2 jogs for resisting entrance of water through the grill while allowing sound from the speaker to pass through the grill, or wherein the front cover defines a main front face, and wherein the grill is flush with the main front face and does not interfere with the light distribution pattern of the LED lens.

Other aspects of the present disclosure may describe wherein the light distribution pattern distributes light across a 180 degree spread along a first orientation and also distributes light across a 180 degree spring along a second orientation perpendicular to the first orientation.

BRIEF DESCRIPTION OF THE DRAWINGS

FIG. 2A through 2E are various perspective views of an notification module within the alert appliance of FIGS. 1A through 1C, according to embodiments of the present disclosure.

FIGS. 4A and 4B are perspective view of a cover for the alert appliance of FIGS. 1A and 1B.

FIGS. 9A through 9D show alternative arrangements of the optical features of the lens, according to embodiments of the present disclosure.

DETAILED DESCRIPTION

Disclosed herein is an audio and/or visual alert or notification appliance capable of meeting or exceeding established UL standards for light and sound distribution regardless of mounting orientation.

In embodiments, the disclosed appliance may be optimally configured for outdoor use.

The present disclosure encompasses features including but not limited to: providing a single device for installation on various surfaces requiring different configurations, including at least compatible installation on both walls and ceilings; providing a single device for surface external or semi-flush installation; providing universal letterplates for accessible and properly oriented text in multiple installation orientations; providing combined mounting and terminals; providing a simple and efficient installation aide to reduce inspection time; and providing a grill designed for restricted ingress and self-draining of intruding water.

The universal and convertible design of the disclosed appliance and system provides for flexibility of installation and reduced inventory due to reducing the necessary accessories required to carry the produce and alternative product for alternative configurations. Letterplates are replaceable and exchangeable, providing for convenient alteration of presented text without sacrificing a complete appliance or system and contributing to the universal and convertible design, as letterplates can readily be adjusted to present text appropriately orientated for one or more mounting arrangements. Terminal parts are integrated within the mounting surface interface, less parts are required for effective installation. The complexity of installation is further reduced by the integration of a hinge to serve as an installation guide and additionally assist in holding or hanging the notification module to the mounting surface interface during installation.

Figure 1A:
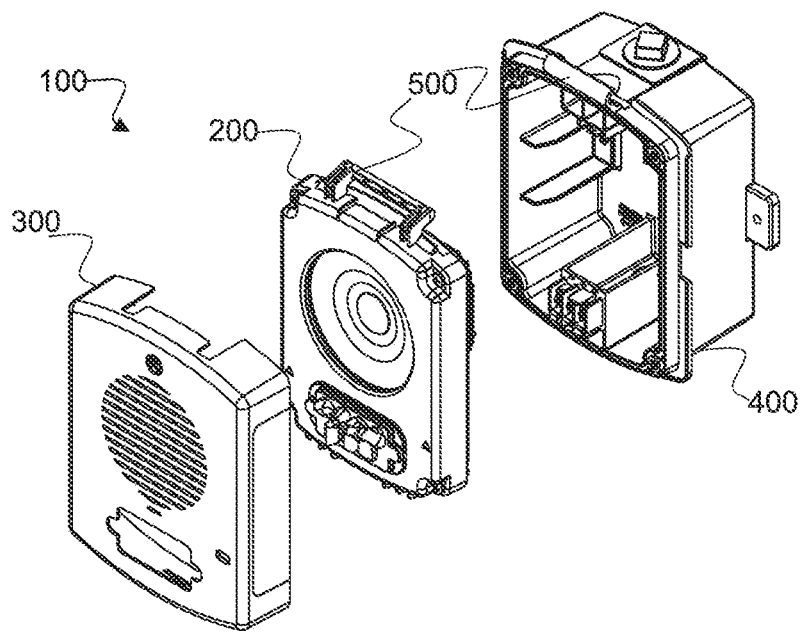
FIGS. 1A through 1C are an exploded view of example alert appliances, according to embodiments of the present disclosure.
Figure 1B:
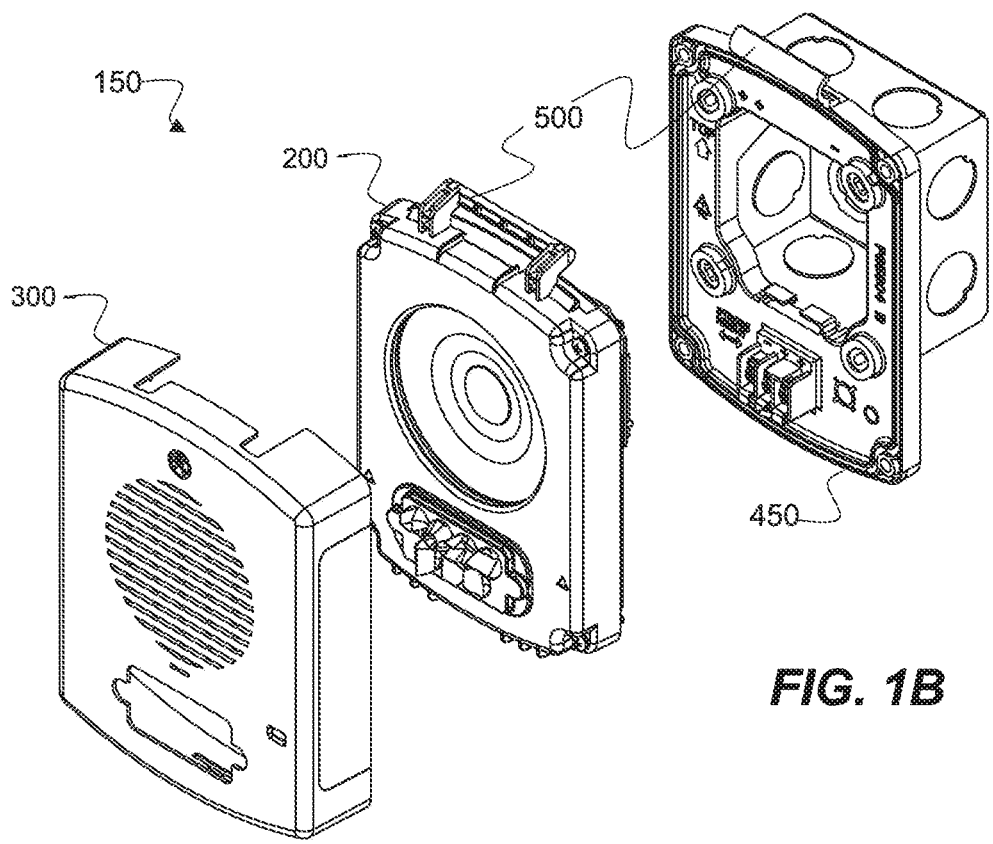

Referring now to FIGS. 1A and 1B, a notification appliance 100, 150 for universal mounting of an audio and/or visual notification is shown, according to embodiments of the present disclosure. In general, the appliance comprises an notification module 200, an appliance cover 300, a surface interface 400, 450, and a capture hinge 500. In embodiments, such as example appliance 100 of FIG. 1A, the surface interface may be a back box 400. In embodiments, such as example appliance 150, the surface interface may be a mounting plate 450, as shown in the example in FIG. 1B. The appliance may be assembled by any appropriate means, such as fasteners, press- or snap-fit, adhesive, etc.

Notification module 200 and surface interface 400, 450 may share a capture hinge 500. Surface interface 400, 450 is constructed such that the appliance can be used for universal installation. For example, surface interface 400, 450 can be at least installed on a wall or a ceiling without any compromise on either of audio or visual output from the notification appliance. In embodiments, surface interface 400, 450 can be installed on atypical surfaces, such as angled walls or ceilings, without compromise of either the audio or visual output of the notification appliance. The appliance is constructed such that surface interfaces 400 and 450 are interchangeable. To switch the appliance between a surface mount, such as back box 400, or a semi-flush mount, such as mounting plate 450, only the surface interface may be changed. Notification module 200 and appliance cover 300 are fully compatible with any surface interface for the appliance, including at least back box 400 and mounting plate 450.

Figure 1C:
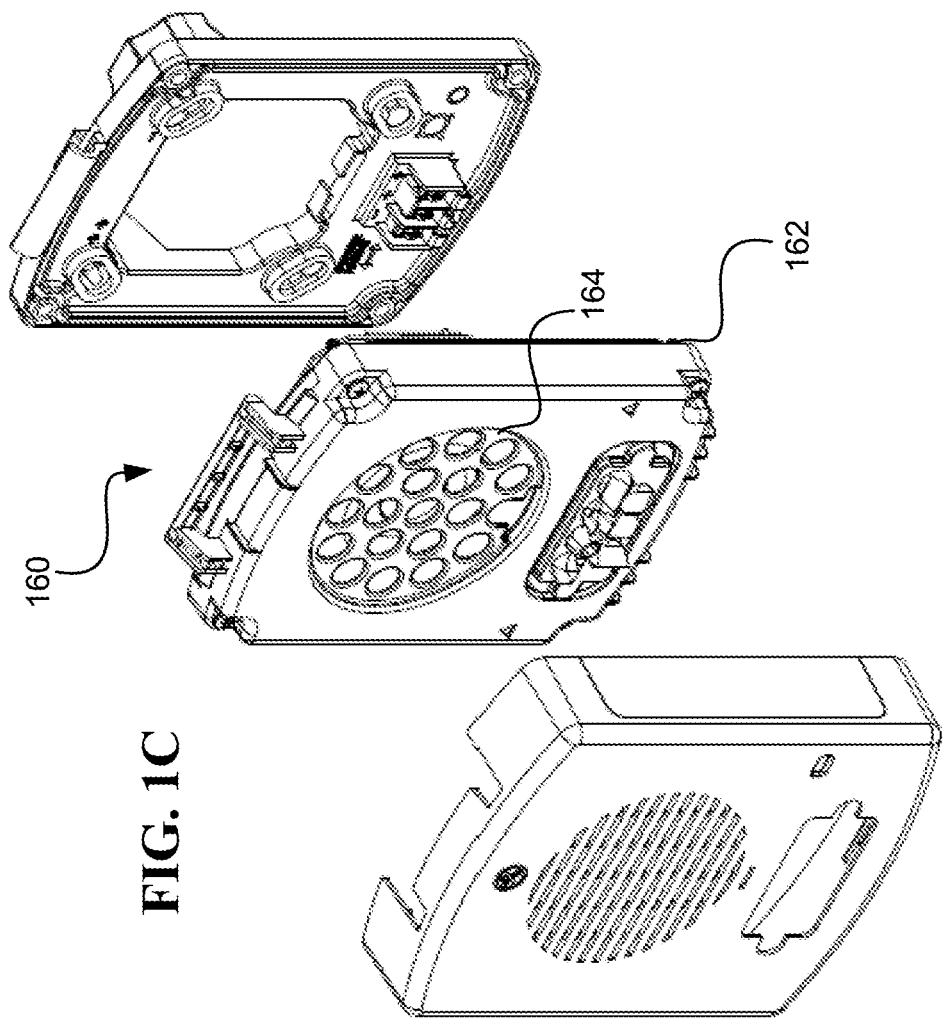
Figure 2E:
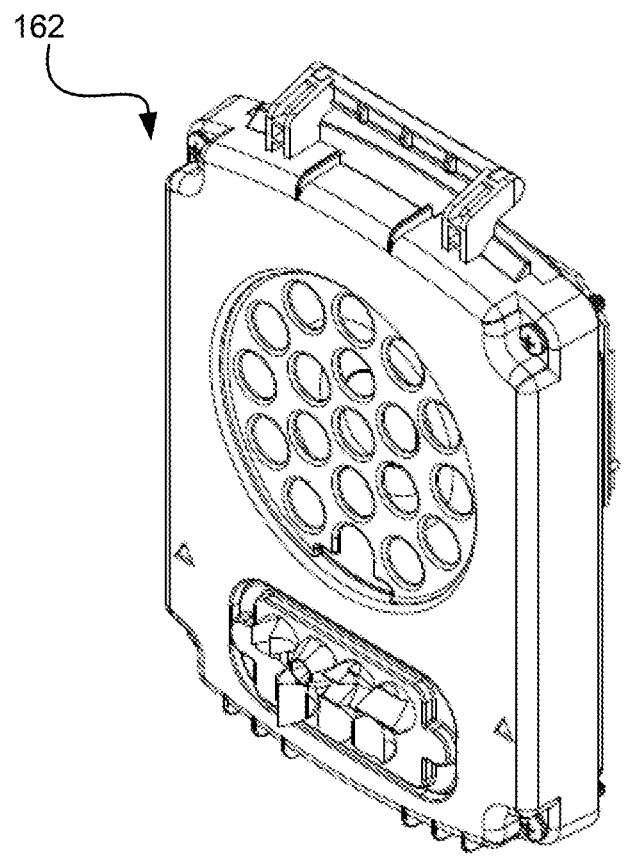
Figure 3A:
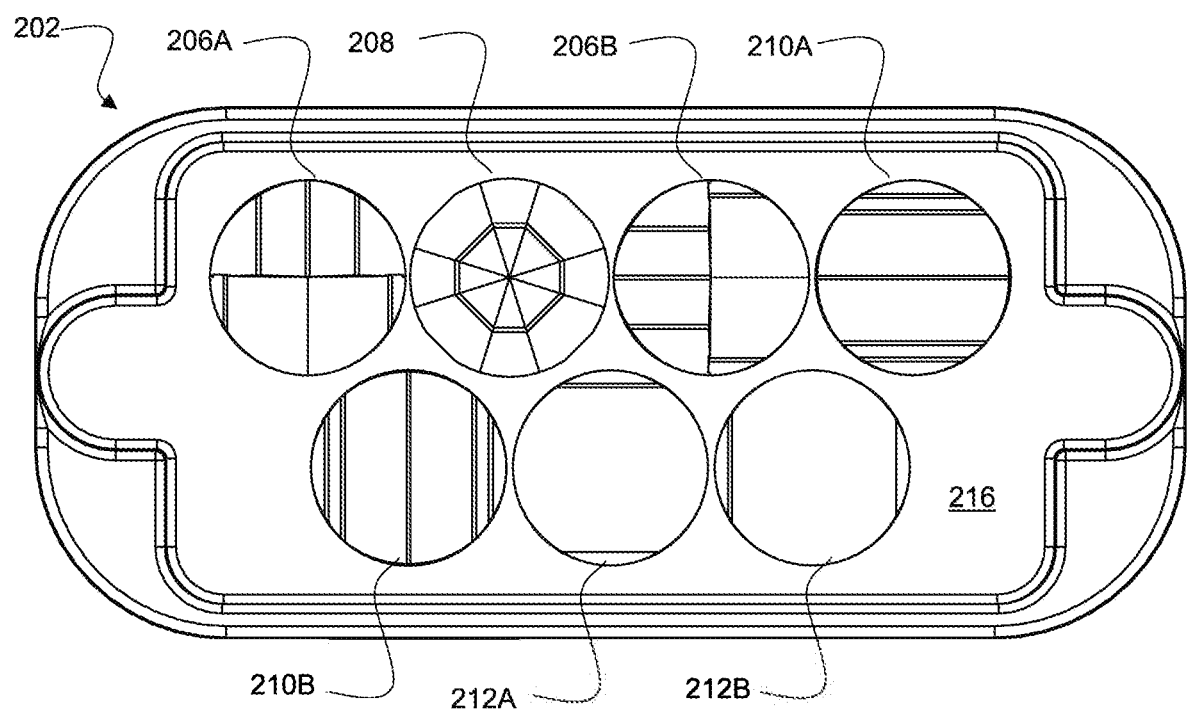
FIG. 3A is a front view of a lens within the notification module of FIG. 2A or 2E.
Figure 3B:
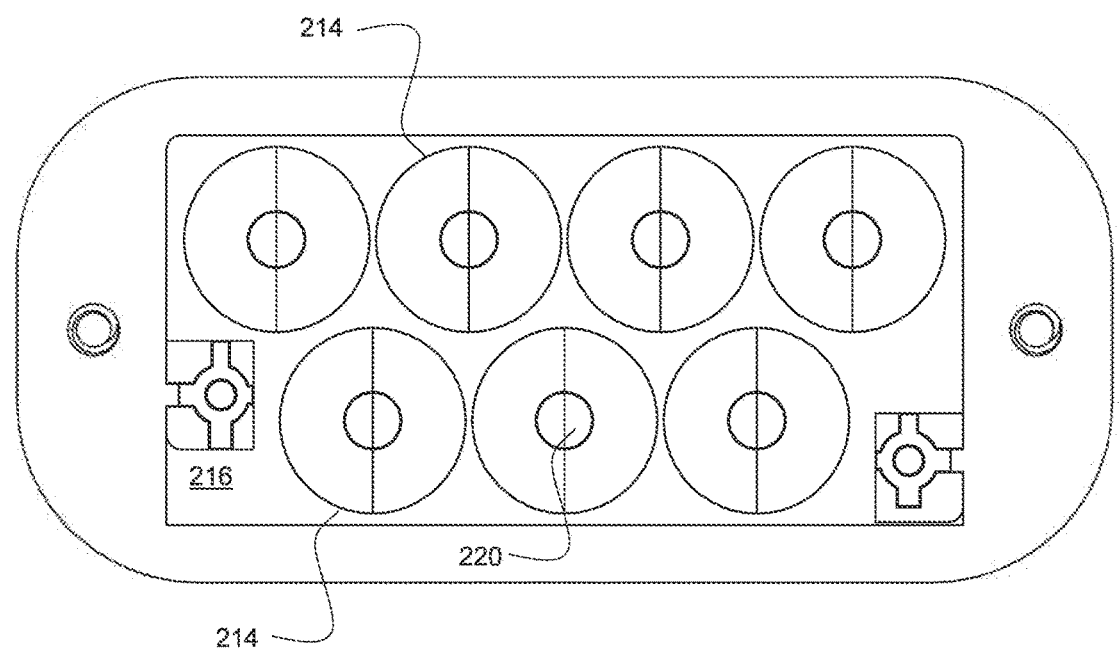
FIG. 3B is a rear view of the lens of FIG. 3A.
Figure 3C:
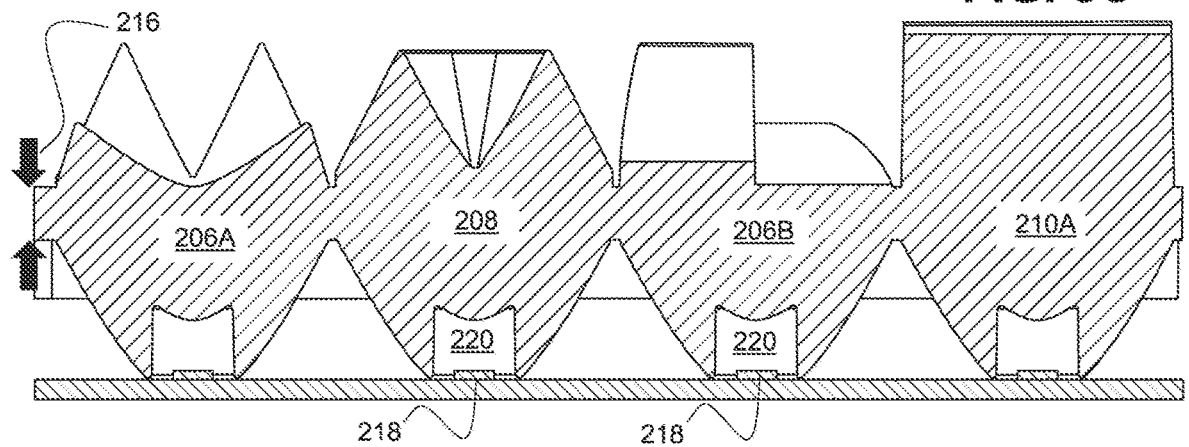
FIG. 3C is a cutaway view of the optical features of the first row of the lens of FIG. 3A.
Figure 3D:
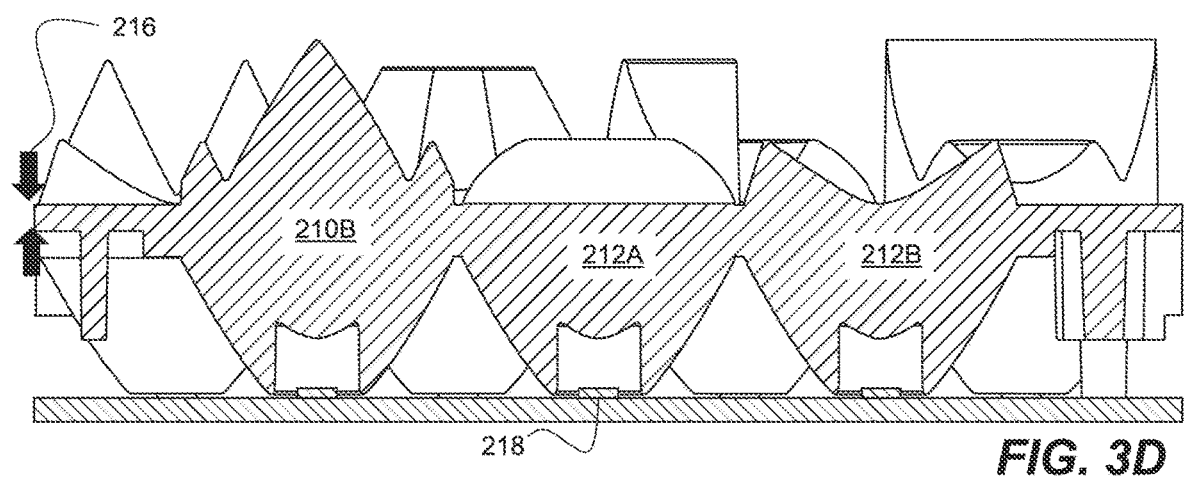
FIG. 3D is a cutaway view of the optical features of the second row of the lens of FIG. 3A.
Figure 5A:
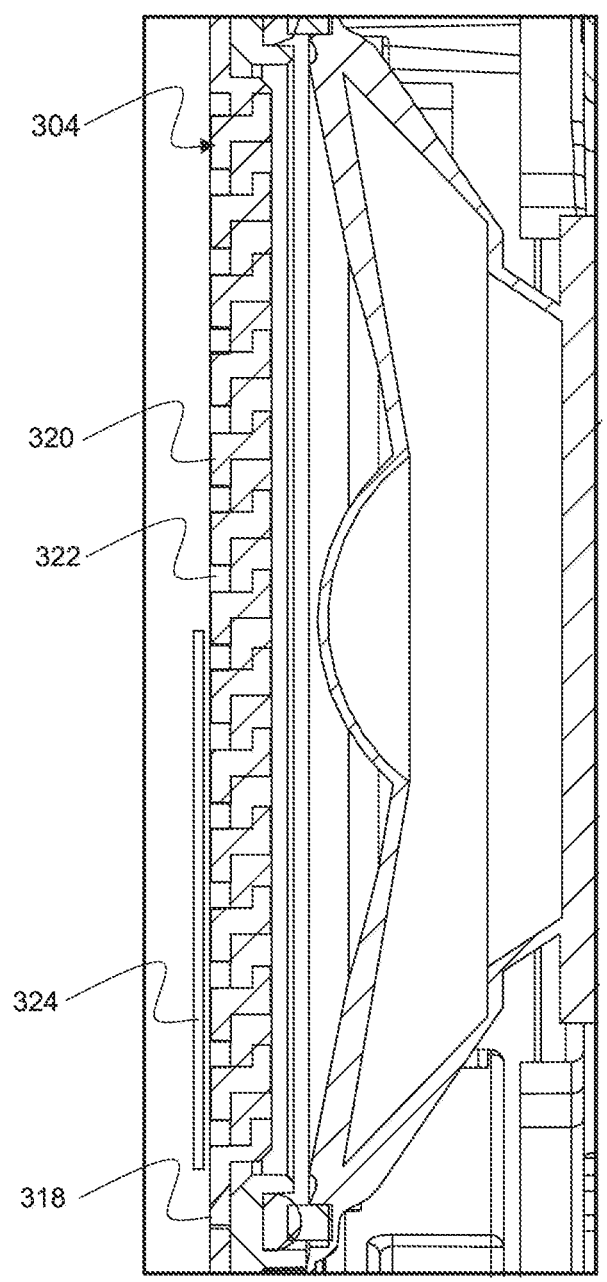
FIGS. 5A and 5B are a cutaway view of an outer grill of the cover of FIGS. 4A and 4B.
Figure 5B:
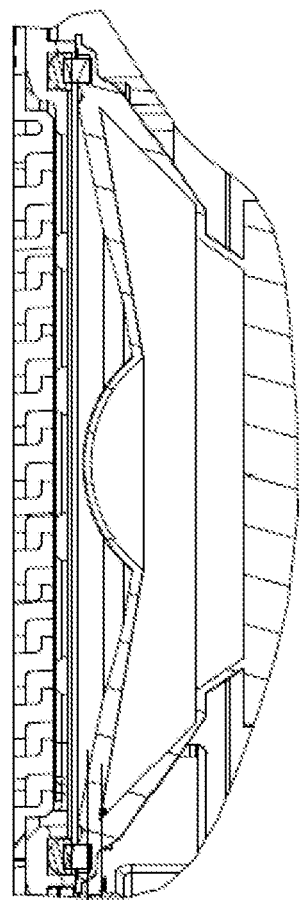

In another embodiment 160, shown in FIGS. 1C and 2E, notification module 162 further includes an inner grill 164 disposed over an audio element. Inner grill 164 provides an additional barrier between internal components of the notification application. Inner grill 164 provides additional structural support to notification module 162 and contributes to improved impact durability and temperature resistance while still permitting effective sound distribution by the audio element.

Referring now to FIGS. 2A through 2G, the notification module 200 generally comprises a lens 202, a speaker 204, a module frame 206, and a pin part 502 of capture hinge 500, which is shared with surface interface 400, 450.

Capture hinge 500 provides assistance to an installer during installation by providing a guide for proper alignment of the notification module 200 with the surface interface 400, 450 to ensure connection between PCBs of the notification module and electrical terminals of the surface interface.

Referring now to FIGS. 3A through 3D, lens 202 is constructed such that it can emit light in all necessary planes for any installation orientation. Lens 202 generally comprises optics features 206A, 206B, 208, 210A, 210B, 212A, 212B, 214, surface group 216, and light sources 218. Lens 202 may be composed of Polycarbonate or other material with a predetermined refractive index (e.g., a high refractive index) that improves the amount of light that can be gathered by the lens. In embodiments, lens 202 may comprise a visual alarm, a strobe, a LED strobe, a beacon, or a light flashing alarm.

Optics features 206A, 206B, 208, 210A, 210B, 212A, and 212B are generally arranged in two rows across lens 202, with an upper row of four optics features and a lower row of three optics features. Optics features 206A, 206B, 208, 210A, 210B, 212A, and 212B generally comprise a unique geometric shape. The size and shape of an optics feature determines the range and pattern of light thrown. For example, each of optics features 206A, 208, 210A, and 212A is a unique geometric shape and each distributes light in a different coverage.

For example, optic feature 206A distributes light with a majority covered 30 to 60 degrees. Optic feature 206A may be divided down a first center axis with different geometric features on either side of the first center axis. On a first side of the first center axis, optic feature 206A is concave, with a lowest point at a second center axis, perpendicular to the first center axis, and rising above surface group 216 to form low peaks towards the edges of the optic feature. On a second side of the first center axis, optic feature 206A may form two peaks, with one on either side of the second center axis. These peaks may be high peaks, relative to the low peaks formed on the first side, rising roughly twice as far above the surface group 216 at the low peaks. These peaks may be equidistant, such that the peak lies evenly between the second center axis and an edge of the optic feature.

Optic feature 208 distributes light with a majority radially or circumferentially directed outward or off-axis and some covering 40 to 60 degrees. Optic feature 208 may be divided into sections of two sizes, with four sections of a first size and four sections of a second size, with the first size being greater than the second size. The eight sections may be distributed evenly with sections of the two sizes alternating, such that each section of the first size is flanked by two sections of the second size, and each section of the second size is flanked by two sections of the first size. In embodiments, optic feature 208 may be configured to radially spread light 360 degrees about a 0 degree axis.

Optic feature 210A distributes light with a majority covering 50 to 90 degrees. Optic feature 210A may feature a high peak at a center axis with two low peaks just inside an outer edge of optic feature 210A.

Optic feature 212A distributes light with a majority covering 0 to 40 degrees. Optic feature 212A may be a generally concave shape, forming a valley with the lowest point of the feature running the length of the feature along a central axis. The feature may rise from this lowest point toward opposing outer edges of the optic feature 212A, forming low peaks just inside the outer edge of the optic feature 212A.

In embodiments, each optics feature 206A, 206B, 208, 210A, 210B, 212A, and 212B distributes light in symmetry such that each distributes light equally to both sides of its central axis. The lower point of any optic feature 206A, 206B, 208, 210A, 210B, 212A, and 212B is an upper surface of surface group 216.

In embodiments, some of optics features 206A, 206B, 208, 210A, 210B, 212A, and 212B may have the same geometric surface conformation, but rotated 90 degrees to achieve light thrown in a different range. For example, optics features 206A and 206B may have some the geometric shape, with optic feature 206B being rotated 90 degree in relation to the orientation of optic feature 206A. In embodiments, lens 202 may comprise a number of such pairs of optics features. For example, the example lens 202 has three such pairs as depicted in FIG. 2B: 206A and 206B, 210A and 210B, and 212A and 212B. Each pair may comprise two optics features with substantially similar geometric features and vary from each other only in terms of their respective axial orientation.

The arrangement of the optics features 206A, 206B, 208, 210A, 210B, 212A, and 212B within the lens 202 including the position of each optics feature 206A, 206B, 208, 210A, 210B, 212A, and 212B according to its shape results in light thrown in a particular distribution. The light thrown from lens 202 produces appropriate alert indication for either of wall or ceiling mounting. Lens 202 is configured such that it fulfills light output requirements for either of wall or ceiling mounting as established by UL regulatory standards. Further, the light output will also fulfill UL regulatory standards when mounted on an angled surface.

Figure 8:
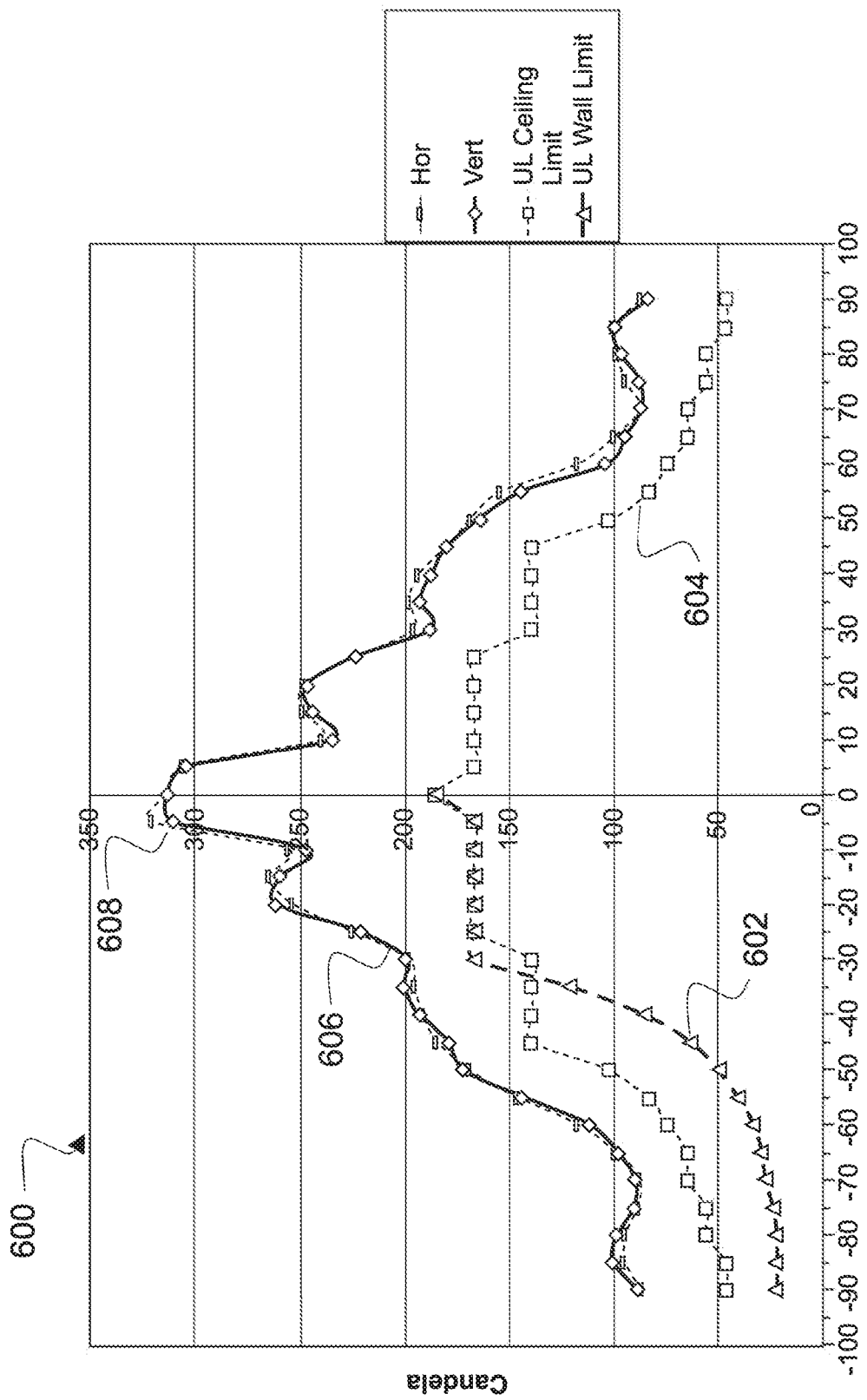
FIG. 8 is a graph of the angle and brightness, in candelas (cds), of light throw by the lens, according to embodiments of the present disclosure.

FIG. 8 presents a graph 600 demonstrating the candela and angle output of the disclosed lens 202 and notification module 200. UL wall limit plot 602 and UL ceiling limit plot 604 show the required light distribution brightness and spread and required under current standards. Vertical distribution plot 606 and horizontal distribution plot 608 show the measured output and throw of the disclosed lens and notification module. As can be seen, the disclosed lens and notification module achieve the required 180 degree throw (−90 degree to 90 degrees) in both the vertical direction 606 and the horizontal direction 608. Further, the candela output of the disclosed lens and notification module well exceeds the UL standard limit. UL standards generally require at least 15 candela (cd) of brightness for the light distributed by an alert appliance. In some cases, the candela output may be configured to be substantially higher. For example, outputs of 20 cd, 50 cd, 100 cd, 150 cd, 175 cd, 177 cd, 200 cd, etc. are envisioned. For both ceiling and wall mount application, as well as possible angled mount applications, vertical can be referred to as a first orientation and horizontal can be referred to as a second orientation, wherein the first and second orientation each have an axis and the two axes are perpendicular to one other.

Figure 7A:
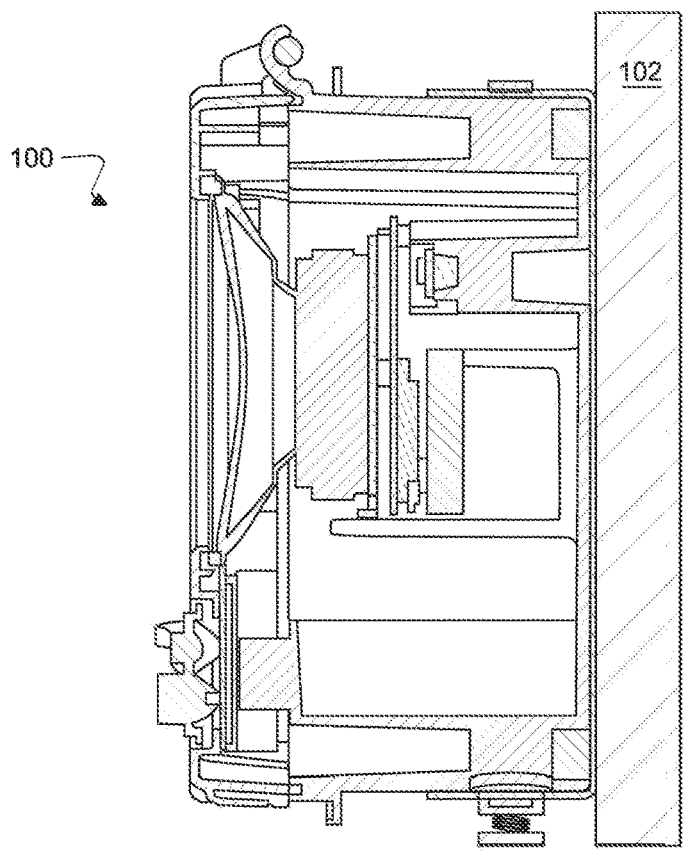
FIG. 7A is a side view of the alert applicant of FIG. 1A.
Figure 9A:
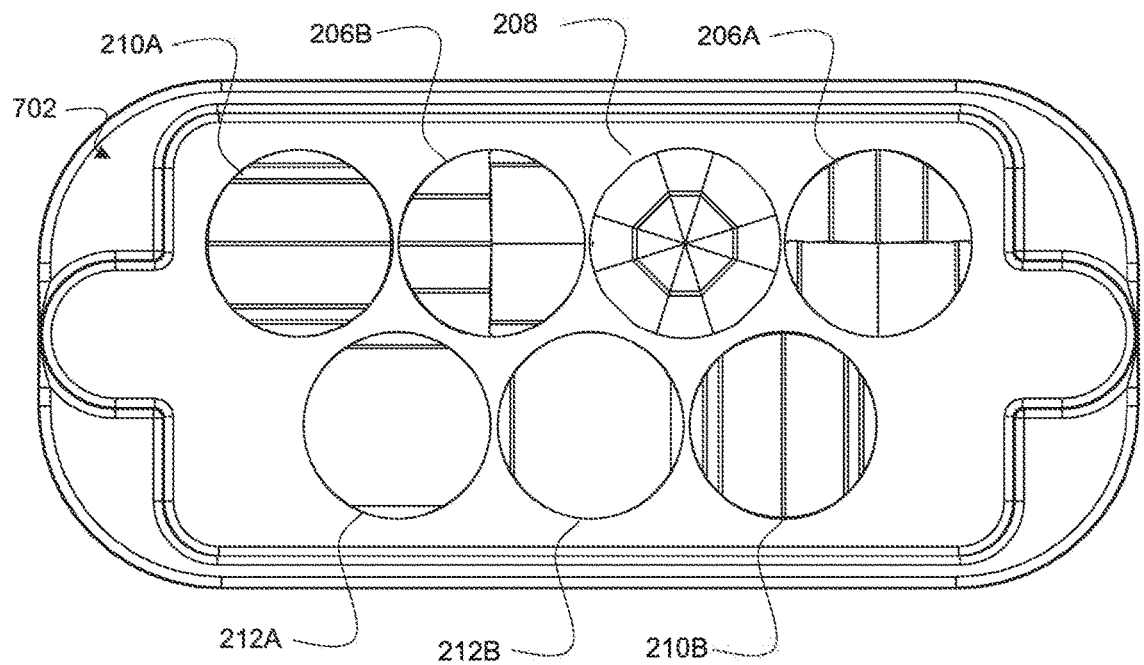
Figure 9B:
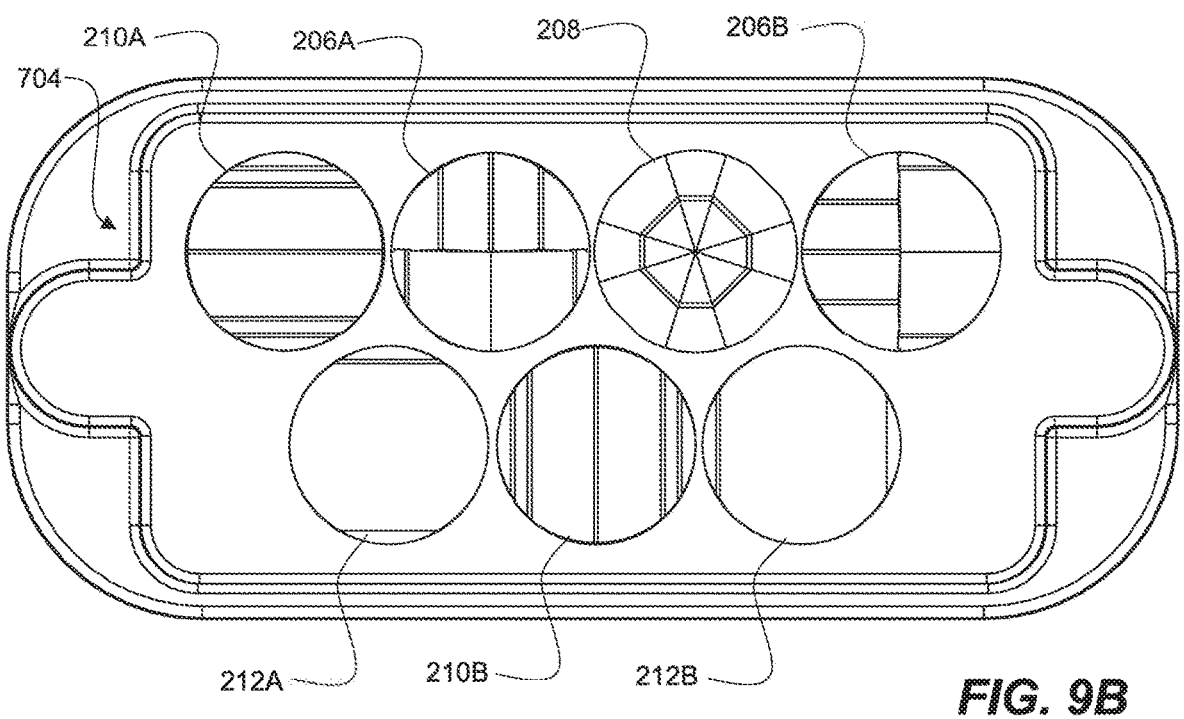

In the example of FIGS. 3A through 3D, the optics features 206A, 206B, 208, 210A, 210B, 212A, and 212B are arranged with the upper row of four features comprising, from left to right, optics features 206A, 208, 206B, and 210A, the lower row of three features comprising, from left to right, optics features 210B, 212A, and 212B. Other embodiments are envisioned, with different arrangements of optics features 206A, 206B, 208, 210A, 210B, 212A, and 212B. Optics features 206A, 206B, 208, 210A, 210B, 212A, and 212B may be arranged in any number of combinations to produce a lens 202 with the appropriate output of brightness and light throw distribution. Optics features 206A, 206B, 208, 210A, 210B, 212A, and 212B may be rearranged, rotated, and scaled to achieve the desired output and performance. Some nonlimited examples of possible arrangements of optics features 206A, 206B, 208, 210A, 210B, 212A, and 212B are shown in FIG. 7A FIG. 9A shows an example lens 702 with an upper row of four optics features, from left to right, of 110A, 106B, 108, and 106A, and a lower row of three optics features, from left to right, of 112A, 112B, and 110B. FIG. 9B shows an example lens 704 with an upper row of four optics features, from left to right of 210A, 206A, 208, and 206B, and a lower row of three optics features, from left to right, of 212A, 210B, and 212B. FIG. 9C shows an example lens 706 with an upper row of four optics features, from left to right of 206A, 208, 210A, and 206B, and a lower row of three optics features, from left to right, of 210B, 212B, and 212B. FIG. 9D shows an example lens 708 with an upper row of four optics features, from left to right of 206B, 208, 206A, and 210A, and a lower row of three optics features, from left to right, of 210B, 212B, and 212B. Some general characteristics of the example embodiments include off-axis optic feature 208 being centrally located in an upper row of four features, along with 206A, 206B, and 210A an in any arrangement with a lower row of three features of 210B, 212A, and 212B in any arrangement.

Figure 10:
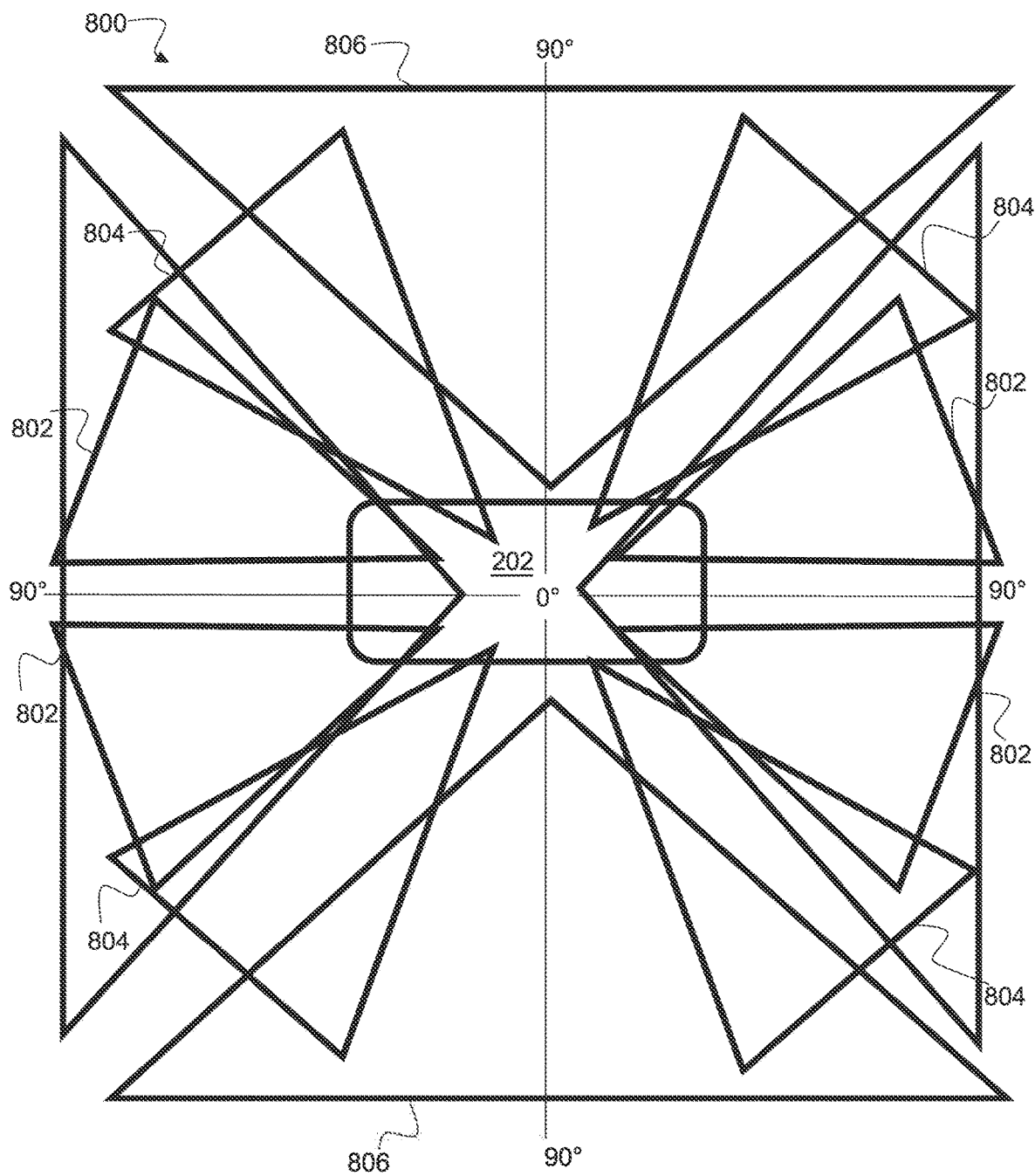
FIG. 10 shows an example light distribution in a plane, according to embodiments of the present disclosure.

FIG. 10 shows an example light distribution 800 demonstrating the full 180 degree distribution as disclosed herein. A first example optical feature may distribute light in a first arc 802, symmetrically to both sides of a central axis. A second optical feature may distribute light in a second arc 804, which partially overlaps with the first arc 802. A third optical feature may distribute light in a third arc 806, which partially overlaps with the second arc 804. Thus, together, the first, second, and third optical feature provide full 180 degree light distribution in a first plane. A fifth, sixth, and seventh optical feature, each being, respectively, the first, second, or third optical feature rotated 90 degree, such that the fifth, sixth, and seventh features, together, provide a full 180 degree light distribution in a second plane which is perpendicular to the first plane. Thus, together, the first, second, third, fourth, fifth, sixth, and seventh optical features provide full 180 degree illumination in both a horizontal and vertical plane, or another pair of perpendicular planes.

Optic feature 214 may be common for each optic feature in lens 202. Optic feature 214 may be any suitable shape providing for placement of LED 218. Optic feature 214 may have a generally bowl or half-sphere shape with a centrally located chamber 220 to accommodate LED 218. The chamber 220 may extend some distance into the optic feature but stop short of surface group 216. Chamber 220 may generally terminate in a convex shape, such that the outer edges of chamber 220 extend farther toward surface group 216 than the center of chamber 220.

Surface group 216 is a group of surfaces underneath the optical features 206A, 206B, 208, 210A, 210B, 212A, and 212B. In embodiments, surface group 216 may form a particular thickness of material. The thickness of surface group 216 contributes to proper light transmission by the lens 202. The greater the thickness of surface group 216 the lower the output of the lens 202.

In embodiments, the light source 218 may generally be LEDs, however, embodiments are envisioned with different light sources which may have the same output range and brightness by modifying the scale of the lens. In embodiments, each individual optic feature 206A, 206B, 208, 210A, 210B, 212A, and 212B may have an individual LED 218 or other light source.

Speaker 204 may be any suitable audio alert component and may not limited to just speakers. In embodiments, it may desirable for speaker 204 for a be a speaker and provide alerts in the form of speech such as "FIRE" or "AGENT DETECTED." In embodiments, it may instead be desirable for speaker 204 to be a horn or other non-speech audio alert component.

Module frame 206 supports and integrates lens 202 and speaker 204 with their support components, such as circuit boards 222, 224 of FIG. 2B. Module frame 206 provides for integration of notification module 200 with the rest of the notification appliance 100, 150. Lens 202 and speaker 204 may receive power and connect to electrical components in surface interface 400, 450 via circuits boards, such as lens printed circuit board (PCB) 222 and speaker PCB 224 in FIG. 2B.

Referring now to FIGS. 4A and 4B, the appliance cover 300 generally comprises a body 302 and one or more letterplates 306A, 306B. Appliance cover body 302 comprises an outer grill 304, receiving slots 314, and a window 316.

Cover body 302 serves to integrate the various components of the appliance cover 300 and provides a beauty cover to obscure more utilitarian elements of the appliance or system.

Outer grill 304 may comprise a drain 318, a plurality of louvers 320, a plurality of slats 322, and a flat front face 324. The louvered design of the outer grill provides for minimized water entry due to restricted direct straight access, with drain 318 providing for swift removal of any accumulated water that does manage to encroach.

Each of the plurality of louvers 320 may form a "step" shape, with a central slat having a slat at either end set at a right angle to the central slat. The central slat may have two side, such as a front side and a back side, with one of the end slats set at a right angle directed outward from the front side and the other set at a right angle directed outward from the back side.

Together, the plurality of louvers 320 and the plurality of slats 322 provide an egress path for sound coming from the speaker, while obstructing the ingress path and minimizing the admission of water from the outside. In embodiments, the plurality of slats 322 may be a second plurality of louvers.

The flat front face 324 of outer grill 304 promotes the full and adequate distribution of light from the lens 202 as the is no raised face or lip to obstruct the distribution of light.

Letterplates 306 may comprise a first side 308, a second side 310, and insertion tabs 312. Letterplates 306 may generally comprise the same material as the rest of the appliance cover 300 or may be a contrasting material.

Letterplates 306 may be extruded, molded, cut, pressed, etc. from a number of suitable materials. Suitable materials may include, by example, plastics, metals, ceramics, composites, Letterplates 306 are a separable part and fully detachable from the rest of the appliance cover 300. In embodiments, letterplates 306 may be integrated with the body 302 using a simple push-in feature. For example, letterplates 306 may integrate with cover body 302 by a press fit or snap fit. Letterplate 306 may be manufactured with insertion tabs 312 protruding from the sides and configured to fit snugly within receiving slots 314 in cover body 302. In embodiments, letterplates 306 may be integrated with the rest of appliance cover 300 by other means, such as glue or a fastener system.

Letterplates 306 may be plain or blank and present a smooth surface consistent with adjacent portions of the body 302, or may be printed, embossed, etched, etc. with words, names, logos, instructions, etc. as appropriate or desired for the appliance and the use. For instance, example letterplates 306 present the text "FIRE." Letterplates 306 may be configured such that text is present on the first side 308 in a first orientation, such as a vertical orientation appropriate for a wall mounting arrangement, and on presented on the second side in a second orientation, such as a horizontal orientation appropriate for a ceiling mounting arrangement.

In the example presented in FIG. 4B, the letterplates 306A and 306B have a first side 308 facing outward and presenting text in a first orientation. If letterplates 306A and 306B are removed and placed in alternate sides, as shown by arrows 316, such that letterplate 306B is in the forward slot, referring to the orientation of the cover 300 as presented in FIG. 4B, with second side 310 is facing outward and presenting the text in a second orientation, and letterplate 306A is in the rearward slot, likewise with a second side 310 facing outward and present the text in a second orientation. The reversable and replaceable letterplates enable the system to be reconfigured in the field. An appliance or system being moved from a first mounting location to a second mounting location with a different orientation from the first mounting location can be readily installed in the new orientation and the letterplates removed, flipped, and reinstalled such that the letterplates are still present text in the appropriate orientation despite the device having changed orientation.

Further, letterplates 306 can be fully replaced should the appliance or system be repurposed to a new alert setting or environment. For example, the appliance may be originally installed to serve as a fire alert and thus have letterplates presenting the text "FIRE." If the setting later transitions to a more generalized alert system, meant to alert personnel to two or more conditions and not only fires, the letterplates presenting the text "FIRE" can be removed and replaced with letterplates reading, for example, "ALERT" or "EVACUATE." This exchange of the letterplates can be performed in the field with only small and lightweight parts to replace, the letterplates themselves, and minimal tools required. The majority of the appliance can be repurposed, and the mounting surface interface need not be disturbed. This presents a simple, accessible, and cost-effective solution to providing an alert system suitable for numerous alert configurations and scenarios.

Window 326 accommodates the protrusion of lens 202 and provides for the free distribution of light from the lens in the appropriate spread.

Figure 6A:
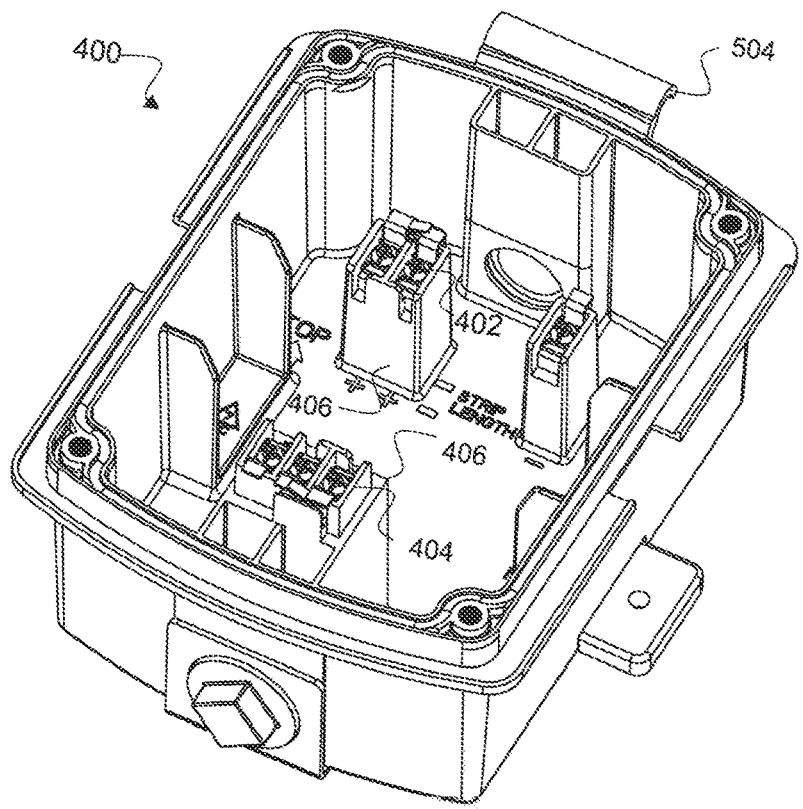
FIG. 6A is a perspective view of a back box surface interface of the alert appliance of FIG. 1A.
Figure 6B:
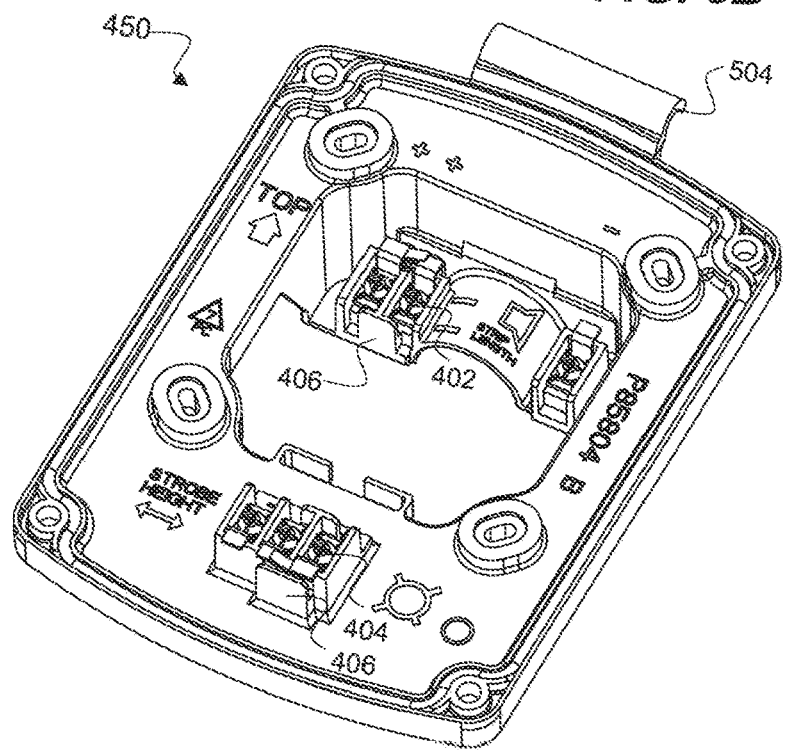
FIGS. 6B and 6C are perspective views of a mounting plate surface interface of the alert appliance of FIG. 1B or 1C.
Figure 6C:
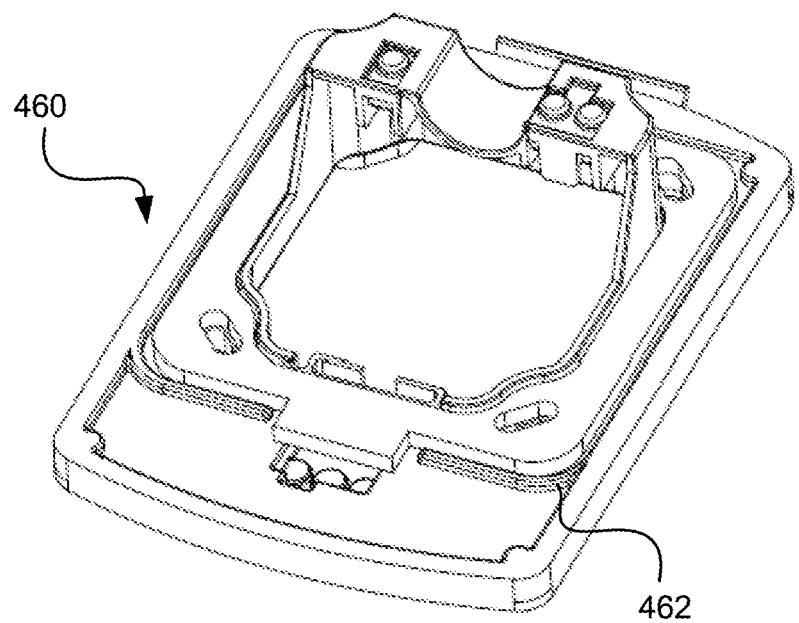

Referring now to FIGS. 6A through 6C, the mounting surface interface may comprise either of back box 400 or mounting plate 450. Surface interface 400, 450 may generally comprise integrated electrical terminals 402 for audio components, integrated electrical terminals 404 for visual components, and towers 406. In some embodiments, such as mounting plate 460 shown in FIG. 6C, a gasket 462 may be incorporate to provide improved sealing between the mounting surface and the device interface. Incorporating of gasket 462 can improve the speed and ease of installation by rendering additional sealing steps, such as caulking around the device once installed, unnecessary.

Surface interface 400, 450 may further comprise a knuckle part 504 of capture hinge 500, which is shared with notification module 200. Capture hinge 500 provides assistance to an installer during installation by providing a guide for proper alignment of the notification module 200 with the surface interface 400, 450 to ensure connection between PCBs of the notification module and electrical terminals of the surface interface.

Integrated electrical terminals 402, 404 may be press fitted on to a tower 406 of appropriate height to form an electrical connection with PCBs from an installed notification module, such as lens PCB 222 and speaker PCB 224 of notification module 200 in FIG. 4C. Integrating electrical terminals 402, 404 into the device precludes the need for separate electrical terminals plate, connectors, adaptors, etc.

Figure 7B:
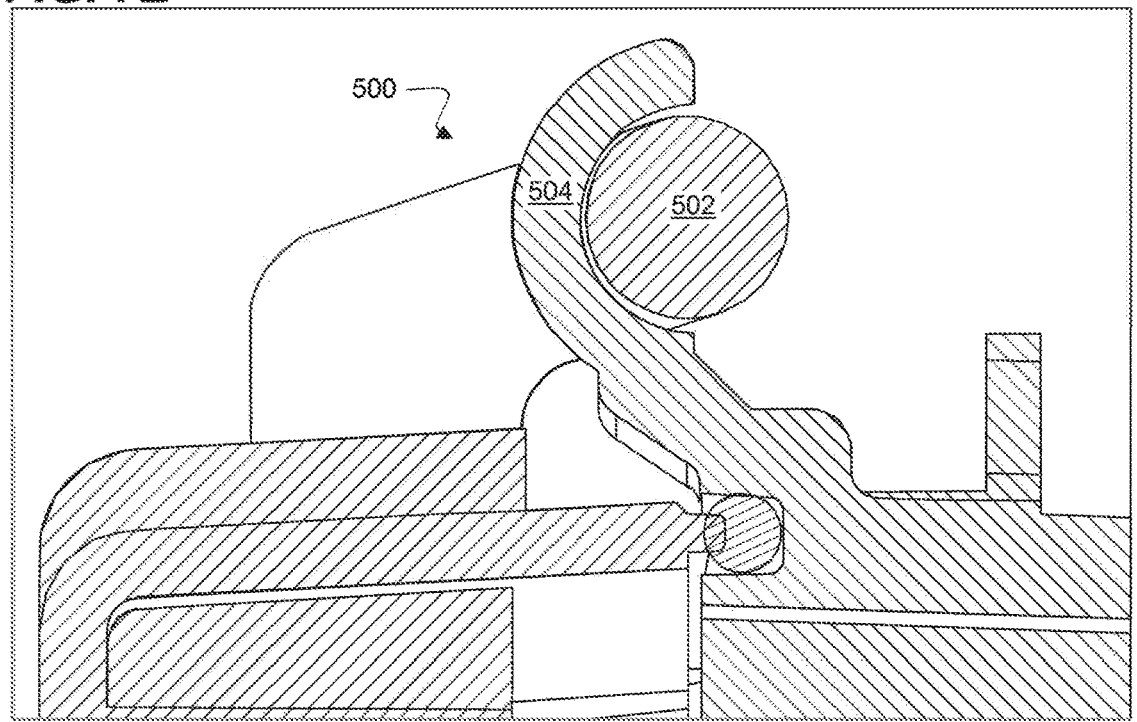
FIG. 7B is a detail view of a capture hinge of the alert appliance of FIG. 1A.
Figure 7C:
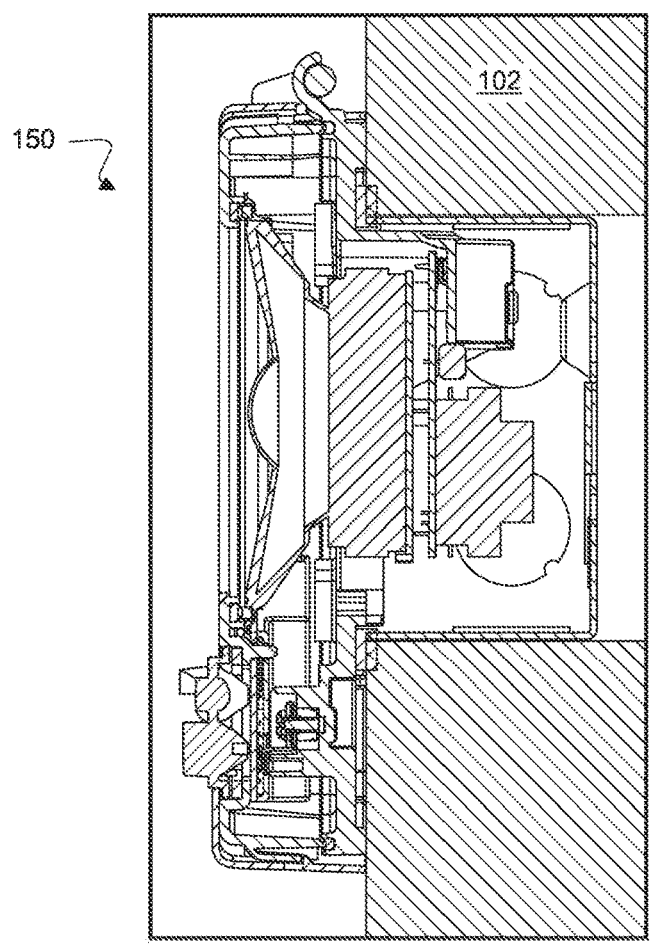
FIG. 7C is a side view of the alert appliance of FIG. 1B or 1C.

Referring now to FIGS. 7A through 7D, system 100, 150 is shown installed, such as on or in a wall or ceiling 102. FIG. 7A shows a system 100 installed with a back box 400 as the surface interface. FIG. 7C shows a system 150 installed with a mounting plate 450 as the surface interface.

Figure 7D:
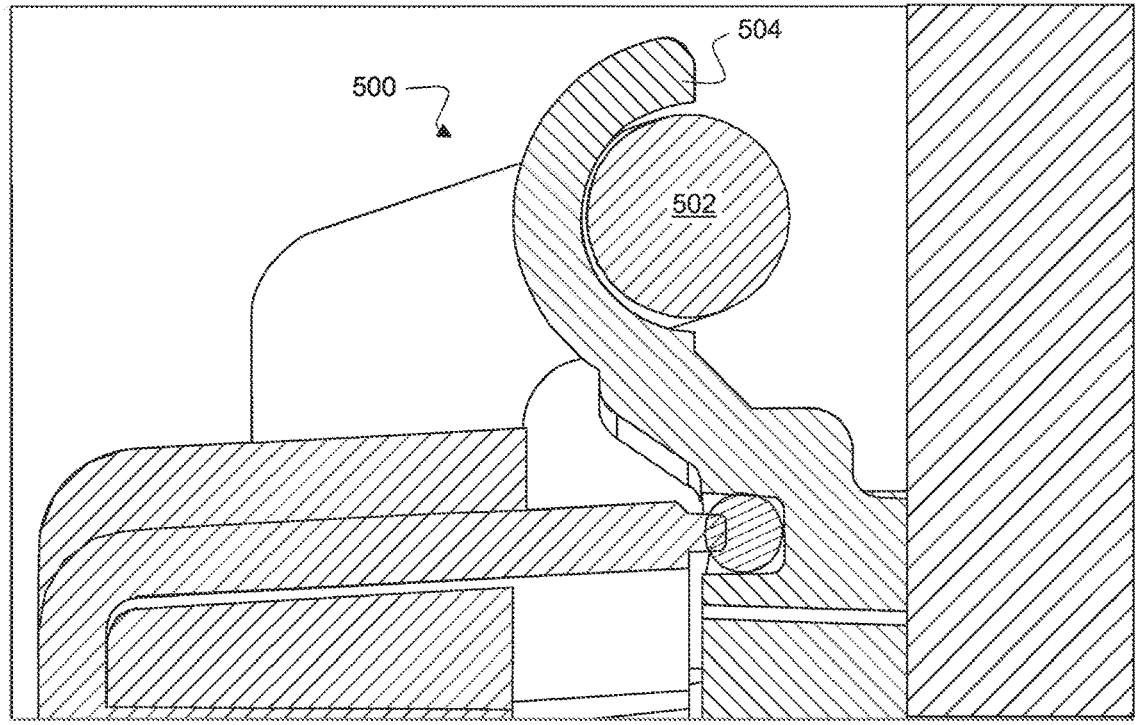
FIG. 7D is a detail view of a capture hinge of the alert appliance of FIG. 1B or 1C.

FIGS. 7B and 7D show a detail view of capture hinge 500. Capture hinge 500 generally comprises a pin part 502, integrated with the notification module 200, and a knuckle part 504, integrated with surface interface 400, 450. Capture hinge 500 provides assistance to an installer during installation by providing a guide for proper alignment of the notification module 200 with the surface interface 400, 450 to ensure connection between PCBs of the notification module and electrical terminals of the surface interface.

Embodiments of the present disclosure encompass the following aspects:

An audio and visual notification appliance comprising a base adapted to be mounted to a ceiling or to a wall, the base including a first audio electrical terminal arrangement and a first LED electrical terminal arrangement; an audio and lighting module including a module frame including a front side and a back side, the module frame supporting an audio system and a lighting system, the back side being adapted for mounting to the base, the audio system including a second audio electrical terminal arrangement adapted to electrically connect with the first audio electrical terminal arrangement when the audio and lighting module mounts to the base to provide electrical power to the audio system, the audio system including an audio speaker at the front side of the module frame, the lighting system including a second LED electrical terminal arrangement adapted to electrically connect with the first LED electrical terminal arrangement when the audio and lighting module mounts to the base to provide electrical power to the lighting system, the lighting system including an LED lens at the front side of the module frame, the LED lens being configured to distribute LED light generated by the lighting system in a light distribution pattern suitable for both ceiling mount and wall mount applications; and a front cover that mounts over the front side of the module frame, the front cover including opposite first and second side walls each defining a panel receiving opening in which a reversible panel mounts, each reversible panel including a first side including lettering arranged in a first orientation suitable for ceiling mount applications and a second side including lettering arranged in a second orientation suitable for wall mount applications, wherein to configure the audio and visual notification appliance for ceiling mount applications the panels are mounted in the panel receiving openings with the first sides of the panels facing outwardly so as to be visible and the second sides of the panels facing inwardly so as to not be visible, and wherein to configure the audio and visual notification appliance for wall mount applications the panels are mounted in the panel receiving openings with the second sides of the panels facing outwardly so as to be visible and the first sides of the panels facing inwardly so as to not be visible.

The audio and visual notification appliance as disclosed, wherein the base can be selected from a first base for configuring the audio and visual notification appliance in a surface mount configuration and a second base for configuring the audio and visual notification appliance in a semi-flush mount configuration.

The audio and visual notification appliance as disclosed, wherein the module frame connects to the base by a hinge including a hook that pivotally engage a hinge pin. Further disclosed is wherein the base can be mounted to the wall or ceiling and connected to electrical wiring prior to mounting of the audio and lighting module to the base, and wherein the hinge guides movement of the audio and lighting module to an aligned position relative to the base in which the first audio electrical terminal arrangement and the first LED electrical terminal arrangement respectively connect with the second audio electrical terminal arrangement and the second LED electrical terminal arrangement. Further disclosed is wherein the audio and visual notification appliance includes first and second opposite sides that extend between first and second opposite ends, wherein the hinge s located at one of the ends and the first and second side walls of the front cove rare located at the first and second opposite sides.

The audio and visual notification appliance as disclosed, wherein letters of the lettering at the first side of each reversible panel are rotated 90 degrees with respect to letters of the lettering at the second side of each reversible panel.

The audio and visual notification appliance as disclosed, wherein the front cover defines an opening for receiving the LED lens, wherein the front cover defines a grill for covering the speaker, wherein the grill includes a grill pattern including openings each having at least 2 jogs for resisting entrance of water through the grill while allowing sound from the speaker to pass through the grill. Further disclosed is wherein the front cover defines a main front face, and wherein the grill is flush with the main front face and does not interfere with the light distribution pattern of the LED lens.

The audio and visual notification appliance as disclosed, wherein the light distribution pattern distributes light across a 180 degree spread along a first orientation and also distributes light across a 180 degree spring along a second orientation perpendicular to the first orientation.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for universal mounting of an audio/visual alert system, comprising:
  a surface interface, comprising:
    a mounting body mountable on either of a vertical surface or a horizontal surface;
    one or more electrical terminals; and
    a notification module, comprising:
      a lens configured to throw light 180 degrees vertically and 180 degrees horizontally at greater than 15 cd;
      a speaker; and
      an appliance cover, comprising:
        a cover body;
        a letterplate having a first side with a text in a first orientation and a second side with the text in a second orientation, wherein the letterplate is fully separable from the rest of the system; and
an outer grill having a flat outer face.

2. The system of claim 1, wherein:
the surface interface further comprises a first part of a capture hinge;
the notification module further comprises a second part of the capture hinge; and
the capture hinge is adapted to align the notification module with the surface interface.

3. The system of claim 1, wherein the first orientation is adapted for a vertical mounting arrangement and the second orientation is adapted for a horizontal mounting arrangement.

4. The system of claim 1, wherein the outer grill comprises a louvered piece forming an outlet path for sound and a tortured inlet path to prevent water entry.

5. The system of claim 1, wherein the outer grill further comprises a drain.

6. The system of claim 1, wherein the surface interface is a box mount.

7. The system of claim 1, wherein the surface interface is a plate mount.

8. The system of claim 1, wherein the system is adapted for outside use.

9. The system of claim 1, further comprising an inner grill arranged over the speaker.

10. The system of claim 1, wherein the surface interface comprises a gasket.

11. An audio and visual notification appliance comprising:
a base adapted to be mounted to a ceiling or to a wall, the base including a first audio electrical terminal arrangement and a first LED electrical terminal arrangement;
an audio and lighting module including a module frame including a front side and a back side, the module frame supporting an audio system and a lighting system, the back side being adapted for mounting to the base, the audio system including a second audio electrical terminal arrangement adapted to electrically connect with the first audio electrical terminal arrangement when the audio and lighting module mounts to the base to provide electrical power to the audio system, the audio system including an audio speaker at the front side of the module frame, the lighting system including a second LED electrical terminal arrangement adapted to electrically connect with the first LED electrical terminal arrangement when the audio and lighting module mounts to the base to provide electrical power to the lighting system, the lighting system including an LED lens at the front side of the module frame, the LED lens being configured to distribute LED light generated by the lighting system in a light distribution pattern suitable for both ceiling mount and wall mount applications; and
a front cover that mounts over the front side of the module frame, the front cover including opposite first and second side walls each defining a panel receiving opening in which a reversible panel mounts, each reversible panel including a first side including lettering arranged in a first orientation suitable for ceiling mount applications and a second side including lettering arranged in a second orientation suitable for wall mount applications, wherein to configure the audio and visual notification appliance for ceiling mount applications the panels are mounted in the panel receiving openings with the first sides of the panels facing outwardly so as to be visible and the second sides of the panels facing inwardly so as to not be visible, and wherein to configure the audio and visual notification appliance for wall mount applications the panels are mounted in the panel receiving openings with the second sides of the panels facing outwardly so as to be visible and the first sides of the panels facing inwardly so as to not be visible.

12. The audio and visual notification appliance of claim 11, wherein the base can be selected from a first base for configuring the audio and visual notification appliance in a surface mount configuration and a second base for configuring the audio and visual notification appliance in a semi-flush mount configuration.

13. The audio and visual notification appliance of claim 11, wherein the module frame connects to the base by a hinge including a hook that pivotally engage a hinge pin.

14. The audio and visual notification appliance of claim 13, wherein the base can be mounted to the wall or ceiling and connected to electrical wiring prior to mounting of the audio and lighting module to the base, and wherein the hinge guides movement of the audio and lighting module to an aligned position relative to the base in which the first audio electrical terminal arrangement and the first LED electrical terminal arrangement respectively connect with the second audio electrical terminal arrangement and the second LED electrical terminal arrangement.

15. The audio and visual notification appliance of claim 14, wherein the audio and visual notification appliance includes first and second opposite sides that extend between first and second opposite ends, wherein the hinge is located at one of the ends and the first and second side walls of the front cover are located at the first and second opposite sides.

16. The audio and visual notification appliance of claim 11, wherein letters of the lettering at the first side of each reversible panel are rotated 90 degrees with respect to letters of the lettering at the second side of each reversible panel.

17. The audio and visual notification appliance of claim 11, wherein the front cover defines an opening for receiving the LED lens, wherein the front cover defines a grill for covering the speaker, wherein the grill includes a grill pattern including openings each having at least 2 jogs for resisting entrance of water through the grill while allowing sound from the speaker to pass through the grill.

18. The audio and visual notification appliance of claim 17, wherein the front cover defines a main front face, and wherein the grill is flush with the main front face and does not interfere with the light distribution pattern of the LED lens.

19. The audio and visual notification appliance of claim 17, further comprising an inner grill arranged over the speaker and integrated with the audio and lighting module.

20. The audio and visual notification appliance of claim 11, wherein the light distribution pattern distributes light across a 180 degree spread along a first orientation and also distributes light across a 180 degree spring along a second orientation perpendicular to the first orientation.

* * * * *